United States Patent
Pfeffer

(10) Patent No.: US 9,641,878 B2
(45) Date of Patent: May 2, 2017

(54) AUTHENTICATION PROCESS

(71) Applicant: DEUTSCHE TELEKOM AG, Bonn (DE)

(72) Inventor: Uwe Pfeffer, Darmstadt (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 14/902,059

(22) PCT Filed: Jul. 3, 2014

(86) PCT No.: PCT/EP2014/064251
§ 371 (c)(1),
(2) Date: Dec. 30, 2015

(87) PCT Pub. No.: WO2015/001052
PCT Pub. Date: Jan. 8, 2015

(65) Prior Publication Data
US 2016/0150253 A1 May 26, 2016

(30) Foreign Application Priority Data
Jul. 4, 2013 (DE) .................. 10 2013 107 047

(51) Int. Cl.
| | |
|---|---|
| *H04N 7/16* | (2011.01) |
| *H04N 21/239* | (2011.01) |
| *H04N 21/258* | (2011.01) |
| *H04N 21/426* | (2011.01) |
| *H04N 21/61* | (2011.01) |

(Continued)

(52) U.S. Cl.
CPC ... *H04N 21/2396* (2013.01); *H04N 21/25816* (2013.01); *H04N 21/25875* (2013.01); *H04N 21/42684* (2013.01); *H04N 21/4367* (2013.01); *H04N 21/443* (2013.01); *H04N 21/4516* (2013.01); *H04N 21/4532* (2013.01); *H04N 21/6175* (2013.01); *H04N 21/6334* (2013.01); *H04N 21/64322* (2013.01); *H04N 21/6543* (2013.01)

(58) Field of Classification Search
CPC .......... H04N 21/2396; H04N 21/4516; H04N 21/64322; H04N 21/443; H04N 21/42684; H04N 21/25816; H04N 21/25875; H04N 21/6334; H04N 21/6543
See application file for complete search history.

(56) References Cited

U.S. PATENT DOCUMENTS

| | | | |
|---|---|---|---|
| 7,549,160 | B1 | 6/2009 | Podar et al. |
| 2007/0022469 | A1 | 1/2007 | Cooper et al. |
| 2007/0097860 | A1 | 5/2007 | Rys et al. |

FOREIGN PATENT DOCUMENTS

| | | |
|---|---|---|
| WO | WO 2007065160 A2 | 6/2007 |
| WO | WO 2012001364 A1 | 1/2012 |

*Primary Examiner* — James R Marandi
(74) *Attorney, Agent, or Firm* — Leydig, Voit & Mayer, Ltd.

(57) ABSTRACT

A process for authentication of a set-top box connected via a local area network to an internet access device includes: performing, by a platform client boot manager, authentication of the set-top box on the basis of an account, wherein performing the authentication further comprises: storing of unique information with the account from which the identity of the set-top box can be derived; and checking the set-top box during the operation based on the identity as to whether multiple set-top boxes are using the same account, and, if so, preventing functioning of the set-top box.

4 Claims, 1 Drawing Sheet

(51) Int. Cl.
*H04N 21/6334* (2011.01)
*H04N 21/6543* (2011.01)
*H04N 21/4367* (2011.01)
*H04N 21/443* (2011.01)
*H04N 21/45* (2011.01)
*H04N 21/643* (2011.01)

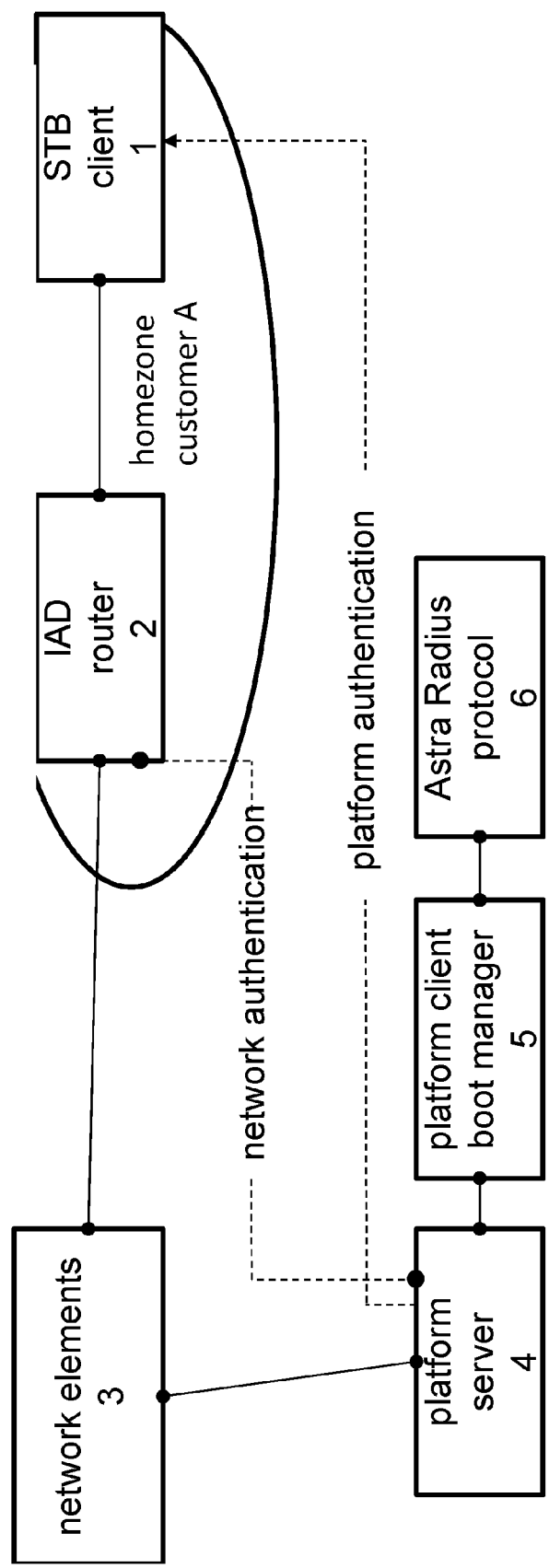

AUTHENTICATION PROCESS

CROSS-REFERENCE TO RELATED APPLICATIONS

This application is a U.S. National Phase application under 35 U.S.C. §371 of International Application No. PCT/EP2014/064251, filed on Jul. 3, 2014, and claims benefit to German Patent Application No. DE 10 2013 107 047.7, filed on Jul. 4, 2013. The International Application was published in German on Jan. 8, 2015, as WO 2015/001052 A1 under PCT Article 21(2).

FIELD

The invention relates to a process and apparatus for authenticating a set-top box, which is connected via a local area network to an internet access device, whereby the internet access device provides access to the internet via a network element, wherein the internet access device authenticates itself using an account to gain access to the internet and a platform client boot manager, which is responsible for authentication of the set-top box, and performs authentication of the set-top box based on the account.

The invention relates to an authentication process in the IPTV field (Internet Protocol Television).

BACKGROUND

Internet Protocol Television (IPTV) generally refers to the transmission path for internet television programs and films as opposed to classical broadcasting, cable or satellite. IPTV is a generic term which can be found in many different forms. The different forms range from simple IPTV via a computer or mobile phone to specific terminal devices, in which the user does not notice that he is using the internet for this purpose, because he is operating a set-top box (STB) via the TV, such as with Apple TV or T-Home Media Receiver. Below follow details for the configuration with T-Home Media receivers. In entertainment electronics, a set-top box is a device that is connected to another device, usually a TV set, thus offering the user additional usage possibilities. In this case, program selection is expanded, since information from the internet is recorded, in particular, films and other TV channels.

SUMMARY

In an embodiment, the invention provides a process for authentication of a set-top box connected via a local area network to an internet access device. The internet access device provides access to the internet via a network element. The internet access device authenticates itself using an account to gain access to the internet with a platform client boot manager, which is responsible for authentication of the set-top box. The method includes: performing, by the platform client boot manager, authentication of the set-top box on the basis of the account, wherein performing the authentication further includes: storing of unique information with the account from which the identity of the set-top box can be derived; and checking the set-top box during the operation based on the identity as to whether multiple set-top boxes are using the same account, and, if so, preventing functioning of the set-top box.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 shows a network environment in which a set-top box is arranged, which is connected via the internet with other components on the internet.

DETAILED DESCRIPTION

The architecture of current authentication systems in the IPTV environment supports nomadic accounts, i.e. a user's set-top boxes (STBs) can be operated with the internet access device (IAD) as an alternative to another DSL connection (same provider). For example, classical routers can be considered as IADs that allow access to the internet or a DSL network. These routers may or may not be equipped with a modem, which is necessary for DSL, VDSL, ADSL networks. As a rule, such a router is an interface to the DSL network and one or more to the LAN via WLAN or Ethernet.

FIG. 1 shows the components needed to construct a connection.

The set-top box (STB) is placed as client 1 after the internet access device (IAD) in front of the output device (TV/display).

The internet access device (IAD) 2 is connected via a network to the client 1 in a local network. In the IPTV environment, the IAD is a router placed after the DSL splitter, enabling internet access. The router stores the customer identifier and password for authentication with the internet service provider via Radius protocol. Below, the customer identifier is referred to as TOID (T-Online Identifier, a unique identifier for an internet access customer of Deutsche Telekom AG). The customer's permissions (booked channels, etc.) are also attached to this customer identifier in the back-end server of the IPTV product.

Via a network element 3, in this case DSLAM (Digital Subscriber Line Access Multiplexer), others are also possible, the usual household phone line is physically connected (via a copper pair) to a DSLAM port. A digital subscriber line access multiplexer, short-DSLAM, is a part needed for operation of the required DSL infrastructure. DSLAMs are placed where subscriber lines converge. Of course, other technologies are conceivable, such as fibreglass up to the customer.

The server platform 4, with a corresponding server, among others, stores the customer identifier and STB client data. The platform server delegates the client boot process to the client platform boot manager 5.

The IPTV platform client boot manager 5
provides platform authentication based on the network authentication, for which the status message of the Astra server 6 is used. Network authentication is usually done via the router 2, since the individual information is stored for authentication. The router normally certifies itself via the Astra server, which uses the Radius protocol, a known standard protocol, to perform authentication in a heterogeneous environment. Details of the Radius protocol can be found in the corresponding standard.
In addition to session status, the client boot manager also receives the DSLAM port (3) used from the Astra server.

It is noted that on the STB on the platform in another household this information runs and is stored.

After login at the household of customer A, the usage possibilities (pay-TV channels) of his IPTV bookings will be available.

Illegal usage possibilities as described below are created via the exchange of internet access identifier.

Moreover, it is assumed that customer B has more usage possibilities than customer A (for example, additional pay-TV bookings). An abuse of this might be that the usage possibilities of customer B are made use of in the household of customer A.

To achieve this, the following steps are necessary.

Step 1) In the household of customer A, the IAD is configured with the internet access identifier of customer B (TOID, password, etc.).

Step 2) A reboot of the STB, whereby the STB 1 of customer A is assigned to customer B by the platform client boot manager 5, and the appropriate permissions are enabled.

Comment: Up to this step basically no abuse is present.

Step 3) In the household of customer A the IAD is now configured with the access identifier of customer A.—The IAD has now been reset to the original state (the internet access identifier is only unique when used simultaneously).

Step 4) The STB in the household of customer A is not booted, so that the usage possibilities of customer B remain valid.

Step 5) Customer B also wants to use the IPTV in his own household. For this, he needs to configure the IAD in the household of customer B with the internet access identifiers of B and start up Step 6) and reboot his STB.

The permissions of a customer could be used simultaneously in the two households, since these were only requested at the start-up and depend on the IAD data.

In an embodiment, the present invention prevents two set-top boxes from working simultaneously, thereby using the same identifier to obtain unauthorized access.

The invention comprises a process for the authentication of a set-top box. The set-top box is connected to an internet access device via a local area network. As a rule, the set-top box is connected via Ethernet or Wi-Fi to the internet access device. Generally, the set-top box thereby downloads certain video data from the internet via the local area network for subsequent display on a television set. To control access of the set-top box to the content to be played, the authentication data that the internet access device provides are used. The internet access device provides access to the internet via a network element, whereby the internet access device authenticates itself using an account to gain access to the internet. The account is usually linked to an access identifier and a password. It should be noted that administration of the account is usually performed centrally, and forwarding of authentication data to the individual components that are responsible for authentication is done using protocols. One such protocol is the Radius protocol. The internet access device is usually connected via a network element which is preferably designed as a DSLAM network device. For its boot process, the set-top box connects via the internet connection made in this manner with a platform client boot manager, which is responsible for authentication of the set-top box and carries out authentication of the set-top box based on the account. In addition, the client manager in the preferred embodiment is responsible for booting the set-top box and also provide data and information for the boot process. When the set-top box contacts the platform client boot manager, the following steps are performed:

Storing unique information in the account from which the identity of the set-top box is revealed;

Checking the set-top box during the operation based on the identity as to whether multiple set-top boxes are using the same account, and, if so, preventing functioning of the set-top box.

In the preferred embodiment, the unique information is a serial number or a network identification of the set-top box. Such an identification may, for example, be network addresses or Mac addresses or identifications specially made for the purpose that are unique and are stored in the set-top box. In addition, a port number that is unique can be used to ensure unambiguous assignment. The port number is preferably a DSLAM port number. This thus constitutes the physical interface of the internet access device with the network element. Typically, authentication is carried out via a platform server, whereby the platform server is specifically responsible for the set-top boxes. In general, there are different platform servers, which are all available for different network services, providing different benefits and services to devices in a network. For authentication and use of the service, access is typically obtained via the Radius protocol to a central entity that manages the account data.

For example, should it be determined by the platform client boot manager, or the platform server, that multiple set-top boxes are available with different unique information that use the same account, it is checked whether these use the same DSLAM port, and if they do not use the same DSLAM port, the set-top box function is prevented. Preventing the function can take different forms: either access to the data is prevented or the functionality of the set-top box is limited, or the set-top box is switched off or restarted.

It is also conceivable that limitation of the set-top box function is carried out independently of the DSLAM port, if it is determined that two different set-top boxes have access to information via the same account.

In a preferred embodiment, on booting the set-top box, the platform client boot manager stores the unique information, and, also based on the unique information, it is checked whether multiple set-top boxes are using the account, in which case the set-top boxes that use the same account are rebooted. Here, the unique information is either stored locally on the platform client boot manager and/or on the platform server, or sent via the Radius protocol to the Astra server to be stored there. Storing is performed in connection with the account information.

In a preferred embodiment, the platform client boot manager account information is obtained via a Radius protocol from a central server, whereby a DSLAM port number is also obtained from this server, to which the internet access device is connected. Thus, it is uniquely established whether multiple set-top boxes are connected to the same account, or login credentials are connected to the internet via different DSLAM ports. If this is the case, it can be assumed that illegal use is present.

In another embodiment, the invention provides a system that implements the aforementioned process. In the preferred embodiment, this is a system comprising a platform manager and/or a platform server and/or the combination with an Astra Radius protocol server.

In particular, this is a system for authenticating a set-top box, in particular, a platform client boot manager (5), which is connected to a set-top box via a network, whereby the set-top box (1) is connected via a local network to an internet access device (2), whereby the internet access device (1)

provides access to the internet via a network element (3), and where the internet access device authenticates itself using an account to gain access to the internet, characterized by Means for receiving an authentication request from the set-top box; these means may include a processor and network interfaces. Usually these are well-known servers that are configured accordingly via software.

Means for obtaining a unique identity of the set-top box; these means may include an interface that is capable of storing the information transmitted by the set-top box. The stored information is then processed further. Obtaining the identity is also usually performed by a processor unit.

A storage unit for storing unique information with the account, from which the identity of the set-top box can be seen; this may include storage systems, hard drives, flash memory.

Means for checking the set-top box during the operation based on the identity, as to whether multiple set-top boxes are using the same account, and, if so, means for preventing functioning of the set-top box. This may include a processor that is controlled by software in a server system. The server system is typically a well-known system with well-known processors, which uses an operating system such as Windows or Linux/Unix or Solaris.

As already stated above, the unique information is a serial number or a network identification of the set-top box and/or a port number of a connection to the network element, whereby the port number is preferably a DSLAM port number.

Based on data that is preferably stored in the database, the processing unit is also equipped to determine whether several set-top boxes are present which are using the same account with different unique information, in order to then check with the aid of the processor whether they are using the same DSLAM port, and if they are not using the same DSLAM port, to prevent the set-top box function.

The platform client boot manager is designed to provide a memory image or configurations for the set-top box, which are then loaded by booting the set-top box so as to configure the set-top box. The set-top box can thus support a remote boot, in which the actual configuration data are not stored on the set-top box, but on the platform client boot manager. During this boot process unique information is exchanged, which is then stored locally in connection with the account. Based on this unique information, the processor checks whether several set-top boxes are using the account, in which case the set-top boxes that are using the same account are rebooted.

The system comprises a network interface and is configured with the appropriate software interfaces in order to obtain account information via a Radius protocol from a central server, whereby a DSLAM port number to which the internet access device is connected is also obtained from this server.

The invention thereby prevents abuse, ensures that the existing usage scenarios at the IAD are retained (e.g., exchange of internet access identifier ["nomadic accounts"]).

FIG. 1 shows a set-top box 1 in the home network of customer A (homezone), connected via a network to an internet access device 2. This internet access device is usually a router that is connected to network element 3 via a corresponding mode. This mode can be DSL, VDSL or other access technologies required for a home to establish operation with the network of a Telekom provider. The router performs network authentication on a platform server 4. The set-top box is also authenticated via this platform server 4 using the platform client boot manager. Here, the platform manager 5 accesses the corresponding Radius server 6 via the Astra Radius protocol in order to verify the authentication data. In this, an account is accessed that as a rule is managed centrally.

The process described in the introduction is modified in step 6, as the set-top box and/or the platform client boot manager are adjusted accordingly. Basically, it is sufficient if the platform client boot manager is adjusted accordingly, since it obtains the identification and stores it with additional information regarding the account, and, where appropriate, the DSLAM port number. In an alternative embodiment, it would, of course, be conceivable that the DSLAM port number be interrogated by the Astra Radius server in case of finding an identical account used by another set-top box.

Step 6) During the STB boot process, the platform client boot manager (5) acts differently in the present invention:

a. During each boot process the platform client boot manager 5 stores the combination of network element, DSLAM port, account and STB (set-top box) identification. What is relevant here is that a unique identifier is used for the set-top box or, for example, a unique identifier for the DSLAM port. On the basis of unique identifiers which are hardware-specific, it is possible to detect whether another set-top box is operated on a different DSLAM port on the basis of the same set-top box. This therefore requires storage of the account information and a unique hardware identification, which make it possible to determine duplicate use of the account.

b. During each boot process, the platform client boot manager 5 checks whether other STBs 1 are online on an account, and, if so, it is checked whether the DSLAM port number concerned is different. If so, the determined STBs for the accounts are started again by a remote reboot command. The resulting boot processes lead to the STBs being assigned to the original household/customer (phase 1). As a result, the STB is returned to its original (reduced) usage possibilities. In the present case, those of customer A. Thus, abuse prevention has been implemented preventively.

No determination of abuse is necessary, and thus no sanctioning of the customer required.

Moreover, use of customer B's IPTV permissions is not limited at any time.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A process for authentication of a set-top box connected via a local area network to an internet access device, wherein the internet access device provides access to the internet via a network element, and wherein the internet access device authenticates itself using an account to gain access to the internet with a platform client boot manager which is responsible for a boot process of the set-top box and authentication of the set-top box,
wherein the process comprises:
performing, by the platform client boot manager, authentication of the set-top box on the basis of the account of the internet access device, wherein performing the authentication further comprises:
storing unique information with the account from which the identity of the set-top box can be derived, wherein the unique information is a Digital Subscriber Line Access Multiplexer (DSLAM) port number; and
checking the set-top box during the boot process based on the identity as to whether multiple set-top boxes are using the same account, and, in case that multiple set-top boxes are using the same account, checking whether the DSLAM port numbers of the multiple set-top boxes are the same, and, further in case that the DSLAM port numbers of the multiple set-top boxes are not the same, rebooting the multiple set-top boxes to return the multiple set-top boxes to previous settings.

2. The process according to claim 1, wherein the platform client boot manager obtains account information via a Radius protocol from a central server, wherein the DSLAM port number to which the internet access device is connected is obtained from the central server.

3. A platform client boot manager, which is connected to a set-top box via a network, wherein the set-top box is connected via a local area network to an internet access device, wherein the internet access device provides access to the internet via a network element, wherein the internet access device authenticates itself using an account to gain access to the internet, wherein the platform client boot manager is responsible for a boot process of the set-top box and for authenticating the set-top box using the account, wherein the platform client boot manager is configured to be executed by one or more processors of a platform server based on processor-executable instructions stored on one or more non-transitory computer-readable media, and wherein execution of the platform client boot manager facilitates:
performing, by the platform client boot manager, authentication of the set-top box on the basis of the account of the internet access device, wherein performing the authentication further comprises:
storing unique information with the account from which the identity of the set-top box can be derived, wherein the unique information is a Digital Subscriber Line Access Multiplexer (DSLAM) port number; and
checking the set-top box during the boot process based on the identity as to whether multiple set-top boxes are using the same account, and, in case that multiple set-top boxes are using the same account, checking whether the DSLAM port numbers of the multiple set-top boxes are the same, and, further in case that the DSLAM port numbers of the multiple set-top boxes are not the same, rebooting the multiple set-top boxes to return the multiple set-top boxes to previous settings.

4. The platform client boot manager according to claim 3, wherein execution of the platform client boot manager further facilitates:
obtaining account information via a Radius protocol from a central server, and obtaining the DSLAM port number to which the internet access device is connected from the central server.

* * * * *